United States Patent
Hayes et al.

(10) Patent No.: US 6,545,861 B1
(45) Date of Patent: Apr. 8, 2003

(54) HIGH VOLTAGE DISTRIBUTION BOX WITH PRE-MOLDED LEAD FRAME

(75) Inventors: Earl James Hayes, South Lyon, MI (US); Raymond Bruce McLachlan, Clinton Township, MI (US); Thomas Dziurlikowski, Westland, MI (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 09/989,053

(22) Filed: Nov. 20, 2001

(51) Int. Cl.[7] .................................................. H02B 1/04
(52) U.S. Cl. ..................... 361/642; 361/630; 361/628; 174/52.1; 439/76.2
(58) Field of Search ................... 361/601, 624–631, 361/632, 640–644, 646, 823, 826, 828; 439/76.2, 250, 251; 174/250, 251, 521

(56) References Cited

U.S. PATENT DOCUMENTS

| | | | | |
|---|---|---|---|---|
| 4,089,041 A | * | 5/1978 | Lockard | 174/52.4 |
| 4,488,201 A | * | 12/1984 | Webb et al. | 361/626 |
| 4,698,727 A | * | 10/1987 | Hibbert et al. | 361/658 |
| 4,721,862 A | | 1/1988 | Cooper | 307/10 R |
| 5,011,417 A | * | 4/1991 | Matsumoto et al. | 439/76 |
| 5,021,923 A | * | 6/1991 | Zinn | 361/679 |
| 5,167,541 A | * | 12/1992 | Alves et al. | 337/186 |
| 5,504,655 A | | 4/1996 | Underwood et al. | 361/707 |
| 5,594,199 A | | 1/1997 | Ciaccio | 174/35 R |
| 5,643,693 A | * | 7/1997 | Hill et al. | 429/121 |
| 5,670,928 A | * | 9/1997 | Cheng et al. | 337/188 |
| 5,700,165 A | | 12/1997 | Harris et al. | 439/621 |
| 5,795,193 A | * | 8/1998 | Yang | 439/621 |
| 5,808,859 A | | 9/1998 | Liang | 361/673 |
| 5,877,944 A | | 3/1999 | Onizuka | 361/826 |
| 5,886,611 A | | 3/1999 | Schaller et al. | 337/189 |
| 5,898,566 A | | 4/1999 | Noschese et al. | 361/642 |
| 5,949,039 A | * | 9/1999 | Koek et al. | 200/50.1 |
| 5,995,380 A | * | 11/1999 | Maue et al. | 361/826 |
| 6,031,446 A | * | 2/2000 | Prohaska et al. | 337/215 |
| 6,396,380 B1 | * | 5/2002 | Girke et al. | 337/188 |

* cited by examiner

*Primary Examiner*—Boris Chervinsky
(74) *Attorney, Agent, or Firm*—Harrington & Smith, LLP

(57) ABSTRACT

A vehicle high voltage electrical distribution box including a housing and a lead frame assembly. The lead frame assembly is located in the housing. The lead frame assembly includes bus bars and an over molded frame which has been over molded onto the bus bars to connect the bus bars to each other.

13 Claims, 3 Drawing Sheets

HIGH VOLTAGE DISTRIBUTION BOX WITH PRE-MOLDED LEAD FRAME

BACKGROUND OF THE INVENTION

1. Field of the Invention

The present invention relates to distribution of electricity and, more particularly, to a voltage distribution box.

2. Brief Description of Prior Developments

Electric vehicles and hybrid vehicles having an electric, battery driven motor are increasingly emerging in the marketplace. One type of current high voltage distribution box for an electric vehicle, used in the General Motors EV vehicle, is built using existing non-automotive components. Because the components used were not designed for vehicle applications, final assembly of the distribution box must be made on the vehicle assembly line. This assembly process requires at least four different tools and a minimum of five assembly steps per electrical cable connection. This makes the design very labor intensive and prone to reliability issues. Although the current design minimizes tooling requirements for manufacturing the distribution box, assembly of the distribution box with the electrical cables is slow and is not scalable to high volumes.

There is a desire to provide a high voltage distribution box which overcomes these problems. There is a desire to reduce assembly costs associated with a high voltage distribution box in an electric vehicle. There is also a desire to eliminate wires within an electric vehicle high voltage distribution box. There is also a desire to provide an electric vehicle high voltage distribution box which requires less space, uses fewer components, and increases reliability by eliminating hard to control hand assembly operations. There is also a desire to provide an electric vehicle high voltage distribution box which enables circuit fuses to be incorporated into the box without increasing space or complexity.

SUMMARY OF THE INVENTION

In accordance with one aspect of the present invention, an electrical distribution box is provided including a housing and a lead frame assembly. The lead frame assembly is located in the housing. The lead frame assembly includes bus bars and an over molded frame which has been over molded onto the bus bars to connect the bus bars to each other.

In accordance with another aspect of the present invention, a vehicle high voltage electrical distribution box is provided including a housing adapted to be mounted to a vehicle and having holes for conductors to pass therethrough; and a lead frame assembly located inside the housing. The lead frame assembly includes a plurality of electrical bus bars; and a molded frame permanently and stationarily connecting the bus bars to each other.

In accordance with another aspect of the present invention, an electric vehicle high voltage electrical distribution box is provided including a housing adapted to be mounted to a vehicle, a lead frame assembly, and electrical fuses. The lead frame assembly is located inside the housing. The lead frame assembly comprising electrical bus bars, a frame over molded onto the electrical bus bars, and electrical fuse terminals connected to the bus bars. The electrical fuses are removably connected to the electrical fuse terminals.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
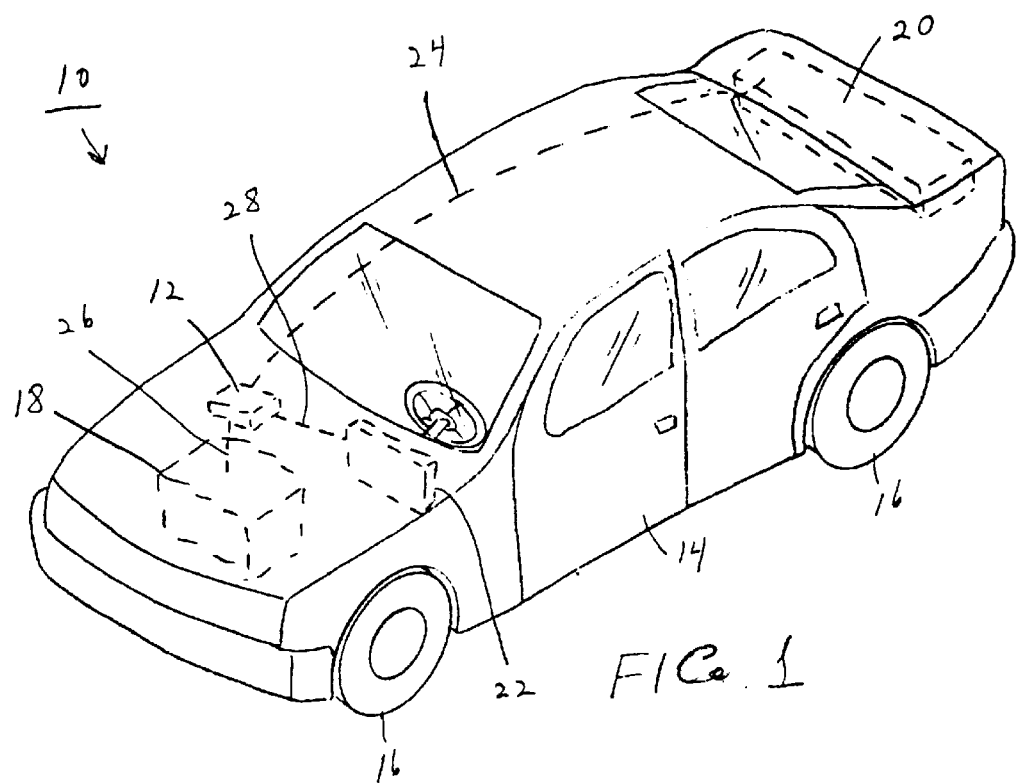
FIG. 1 is a schematic diagram of a vehicle having a high voltage distribution box incorporating features of the present invention.

Referring to FIG. 1, there is shown a schematic perspective view of a vehicle 10 having a high voltage distribution box 12 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The vehicle 10 generally comprises a chassis and body 14, wheels 16, a drive 18, a battery 20, auxiliary electrical components 22 and the distribution box 12. The vehicle in the embodiment shown is a passenger car. However, features of the present invention can be used in any suitable type of vehicle, such as a truck, a motorcycle, or watercraft.

The drive 18 can comprise an electric motor or a hybrid internal combustion engine and electric motor combination. The drive 18 is connected to one or more of the wheels 16. The electric motor or an electric motor portion of the drive 18 is connected to the battery 20 through the distribution box 12. More specifically, an electrical conductor cable 24 extends from the battery to the distribution box 12. Another electrical conductor cable 26 extends from the distribution box 12 to the drive 18. One or more additional electrical conductor cables 28 extend from the distribution box 12 to the auxiliary electrical components 22.

Figure 2:
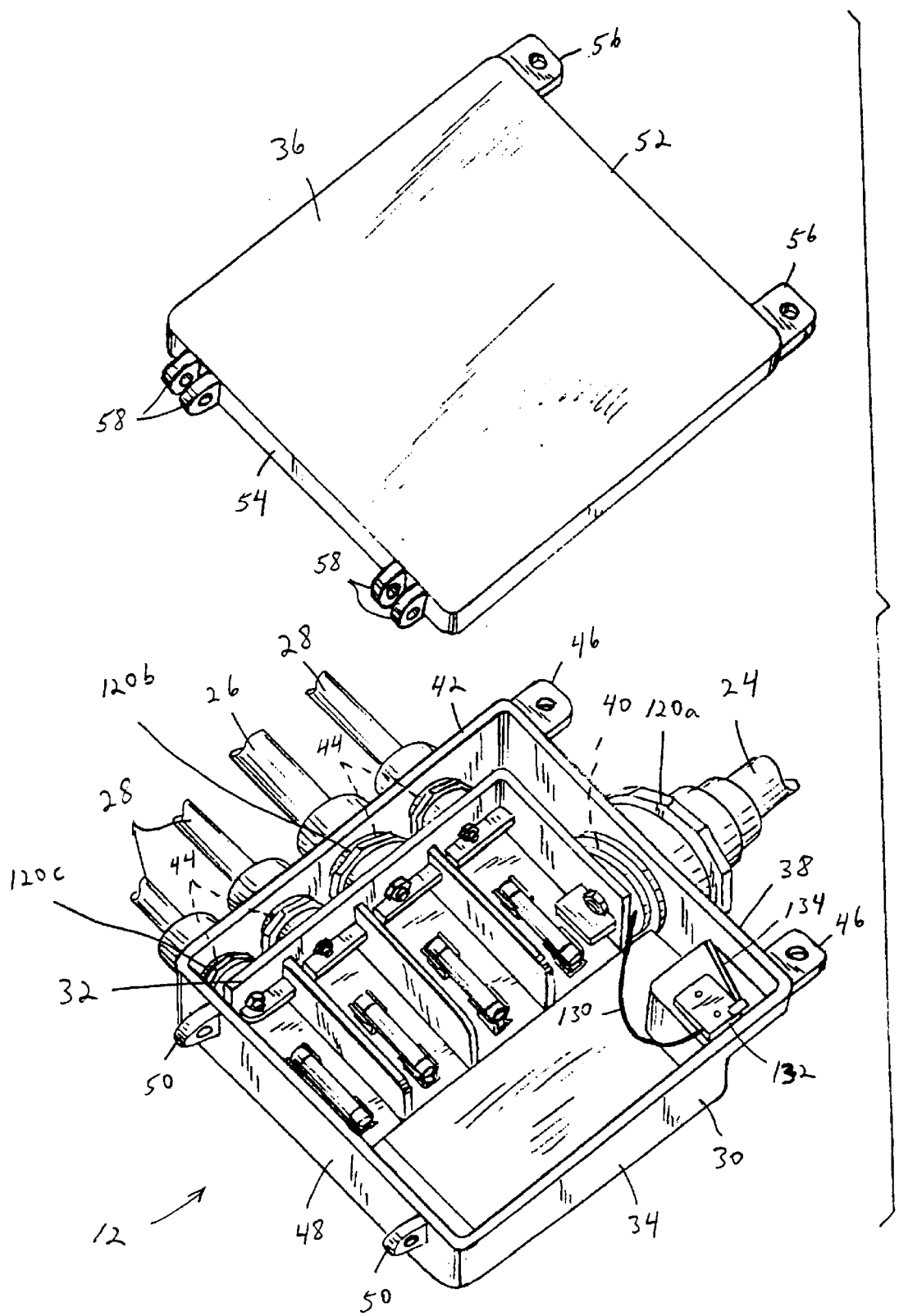
FIG. 2 is a perspective view of the distribution box shown in FIG. 1 with its cover removed.

Referring also to FIG. 2, the distribution box 12 generally comprises a housing 30 and a lead frame assembly 32. The housing 30 generally comprises a container 34 and a cover 36. However, in alternate embodiments the housing 30 could comprise more or less than two components. The two housing components 34, 36 are preferably comprised of molded plastic or polymer material. However, in alternate embodiments, the housing pieces could be comprised of any suitable type of materials.

The container 34 has a general box shape with an open top side. A first sidewall 38 of the container 34 has a main aperture 40 therethrough. A second sidewall 42, which is generally perpendicular to the first sidewall 38, has a plurality of secondary apertures 44 therethrough. However, the apertures 40, 44 could be provided in any suitable sides of the container 34. The container 34 could also have any suitable type of shape. In the embodiment shown, the first sidewall 38 also comprises fastener tabs 46. A third sidewall 48 of the container 34 comprises pivot posts 50.

The cover 36 comprises a first sidewall 52 and an opposite second sidewall 54. The first sidewall 52 comprises fastener tabs 56. The second sidewall 54 comprises pivot posts 58. In alternate embodiments, any suitable shape or type of cover could be provided. The pivot posts 58 can be pivotably connected to the pivot posts 50. This pivotably mounts the cover 36 to the container 34. However, in alternate embodiments, the cover 36 could be movably or removably connected to the container 34 in any suitable manner. The fastener tabs 56 are adapted to be aligned with the fastener tabs 46 when the cover 36 is in a closed position. Fasteners (not shown) can attach the fastener tabs 46, 56 to each other to lock the cover 36 in a closed position. However, in alternate embodiments, any suitable means could be used to latch or retain the cover 36 in a closed position relative to the container 34.

Figure 3:
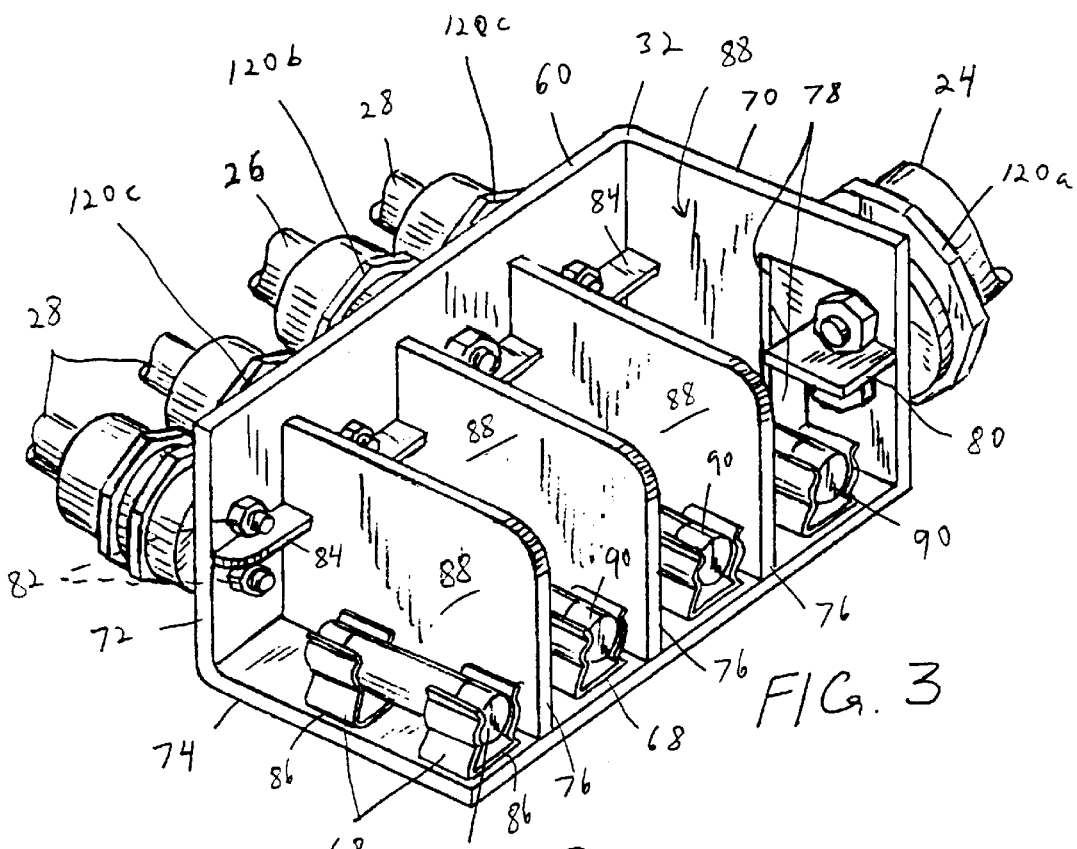
FIG. 3 is a perspective view of the lead frame assembly shown in FIG. 2.
Figure 4:
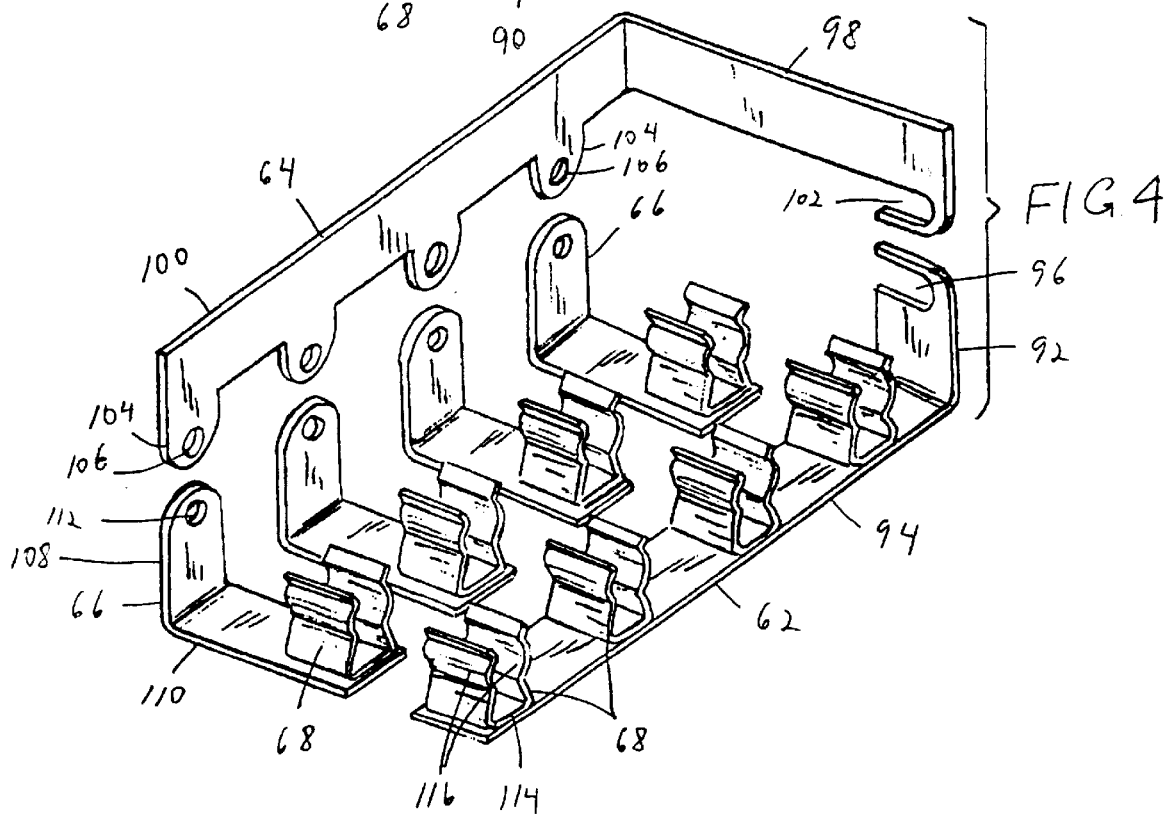
FIG. 4 is a perspective view of the bus bars used in the assembly shown in FIG. 3.

Referring also to FIGS. 3–4, the lead frame assembly 32 generally comprises a frame 60, electrical bus bars 62, 64 and 66, and electrical fuse terminals 68. In alternate embodiments, the lead frame assembly 32 could comprise additional or alternatives components. The frame 60 is preferably comprised of a one piece molded plastic or polymer material. However, in alternate embodiments, the frame 60 could be comprised of more than one piece and/or could be comprised of any suitable type of materials and/or manufactured with any suitable type of manufacturing process.

The frame 60 generally comprises three orthogonal support sidewalls 70, 72 and 74, three orthogonal generally open sides, and dividers 76. However, in alternate embodiments, the frame could have any suitable type of shape. For example, the frame could comprise more than three orthogonal support sidewalls and/or the frame could comprise more or less than three dividers.

The first support sidewall 70 comprises two interconnected apertures 78 therethrough. The first sidewall 70 also comprises a shelf 80 located between portions of the two apertures 78. The shelf 80 extends inward from an interior side of the first sidewall 70.

The second sidewall 72 comprises pairs of apertures 82 therethrough. The second sidewall 72 also comprises a plurality of shelves 84 located between apertures 82 in each pair of apertures. The shelves 84 extend inward from an interior side of the second sidewall 72. In alternate embodiments, the first and second support sidewalls might not comprise shelves.

The third support sidewall 74 is connected to the bottoms of the first and second sidewalls. The third support sidewall 74 has the dividers 76 extending upward from its top surface. The dividers 76 also extend inward from the second support sidewall 72. The third support sidewall 74 also comprises apertures 86 extending into the top surface of the third support sidewall 74. The apertures 86 are provided as pairs of apertures. More specifically, each pair of apertures 86 is separated from an adjacent pair of apertures by one of the dividers 76. The dividers 76 extend from the second and third orthogonal support sidewalls towards two of the orthogonal open sides. The frame 60 forms separate areas 88 for receiving and mounting electrical fuses 90 as shown.

The electrical bus bars 62–66 are preferably located inside the frame 60. More specifically, in the embodiment shown, the frame 60 is preferably over molded onto the electrical bus bars 62–66. However, in alternate embodiments, the frame 60 might not be over molded onto the electrical bus bars. Instead, the housing 60 could comprise multiple components which are assembled or sandwiched with the electrical bus bars.

The first bus bar 62 comprises a one-piece member made of electrically conductive material. However, in alternate embodiments, the first bus bar could be comprised of more than one member. In the embodiment shown, the first bus bar 62 has a general L shape. However, in alternate embodiments, the first bus bar could comprise any suitable type of shape. The first bus bar 62 comprises a first leg 92 and a second leg 94. The first leg 92 extends along a portion of the first support sidewall 70. The second leg 94 extends along a portion of the third support sidewall 74. The first and second legs are generally perpendicular to each other. The first leg 92 comprises an aperture 96 therethrough. In the embodiment shown, the aperture 96 has an open side. However, in alternate embodiments, the aperture 96 could have any suitable type of shape.

The first bus bar 62 is substantially entirely encased by the material which forms the frame 60 except at the bottom one of the apertures 78 and at the outer ones of the apertures 86. A portion of the first leg 92 extends out of the material which form the frame 60 into the bottom one of the apertures 78 in the first sidewall 70. This forms an area for making an electrical connection to the first bus bar 62 at the first support sidewall.

The second leg 94 has four of the electrical fuse terminals 68 directly attached to a top side thereof. The electrical fuse terminals 68 extend from the first bus bar 62, through the apertures 86, into the fuse receiving areas 88. In an alternate embodiment, the electrical fuse terminals could be integrally formed from the member which forms the first bus bar, or could be attached to the first bus bar by another member.

The second bus bar 64 comprises a one-piece member made of electrically conductive material. However, in alternate embodiments, the second bus bar could be comprised of more than one member. In the embodiment shown, the second bus bar 64 has a general L shape. However, in alternate embodiments, the second bus bar could comprise any suitable type of shape. The second bus bar 64 comprises a first leg 98 and a second leg 100. The first leg 98 extends along a portion of the first support sidewall 70. The second leg 100 extends along a portion of the second support sidewall 72. The first and second legs are generally perpendicular to each other. The first leg 98 comprises an aperture 102 therethrough. In the embodiment shown, the aperture 102 has an open side. However, in alternate embodiments, the aperture 102 could have any suitable type of shape.

The second bus bar 64 is substantially entirely encased by the material which forms the frame 60 except at a top one of the apertures 78 and at top ones of the apertures 82. A portion of the first leg 98 extends out of the material which form the frame 60 into the top one of the apertures 78 in the first sidewall 70. This forms an area for making an electrical connection to the second bus bar 64 in the first support sidewall. In alternate embodiments the second bus bar 64 could have any suitable type of shape.

The second leg 100 has four downward projections 104. However, in alternate embodiments, the second leg could comprise more or less than four downward projections. In the embodiment shown, each downward projection 104 comprises an aperture 106 therethrough. However, in alternate embodiments, the second leg could comprise more or less than four apertures therethrough. Portions of the second leg 100 extend out of the material which form the frame 60 into the apertures 82 in the second sidewall 72. This forms areas for making electrical connection to the second bus bar 64 in top ones of the apertures 82 at the second sidewall 72.

In the embodiment shown, the lead frame assembly 32 comprises four of the third bus bars 66. However, in alternate embodiments, the lead frame assembly could comprise more or less than four of the third bus bars. The third bus bars 62 are each comprised of a one-piece member made of electrically conductive material. However, in alternate embodiments, each of the third bus bars could be comprised of more than one member. In the embodiment shown, each third bus bar 66 has a general L shape. However, in alternate embodiments, the third bus bars could comprise any suitable type of shape. In addition, the third bus bars could have different shapes relative to each other. Each third bus bar 66 comprises a first leg 108 and a second leg 110. The first leg 108 extends along a portion of the second support sidewall 72. The second leg 110 extends along a portion of the third support sidewall 74. The first and second legs are generally perpendicular to each other. The first leg 108 comprises an aperture 112 therethrough.

The third bus bars 66 are substantially entirely encased by the material which forms the frame 60 except at bottom ones of the apertures 82 in the second support sidewall 72 and at inner ones of the apertures 86 in the third support sidewall 74. A portion of the first leg 108 extends out of the material which form the frame 60 into the bottom ones of the apertures 82 in the second sidewall 72. This forms areas for making an electrical connection to the third bus bars 66 at the second sidewall 72.

Each second leg 110 has one the electrical fuse terminals 68 directly attached to a top side thereof. The electrical fuse terminals 68 extend from the third bus bars 66, through the apertures 86, into the fuse receiving areas 88. In an alternate embodiment, the electrical fuse terminals could be integrally formed from the members which form the third bus bars, or could be attached to the third bus bars by another member.

The electrical fuse terminals 68 are preferably comprised of metal. Each terminal 68 comprises a base 114 and two cantilevered arms 116. The bases 114 are fixedly attached to the first and third bus bars 62, 66, such as by welding or soldering. The cantilevered arms 116 are adapted to resiliently deflect outward for removably receiving a contact area of one of the electrical fuses 90 therebetween. However, in alternate embodiments, any suitable means could be used for attaching the bus bars to the fuses. In another alternate embodiment, the lead frame assembly could be configured not to receive fuses.

Figure 5:
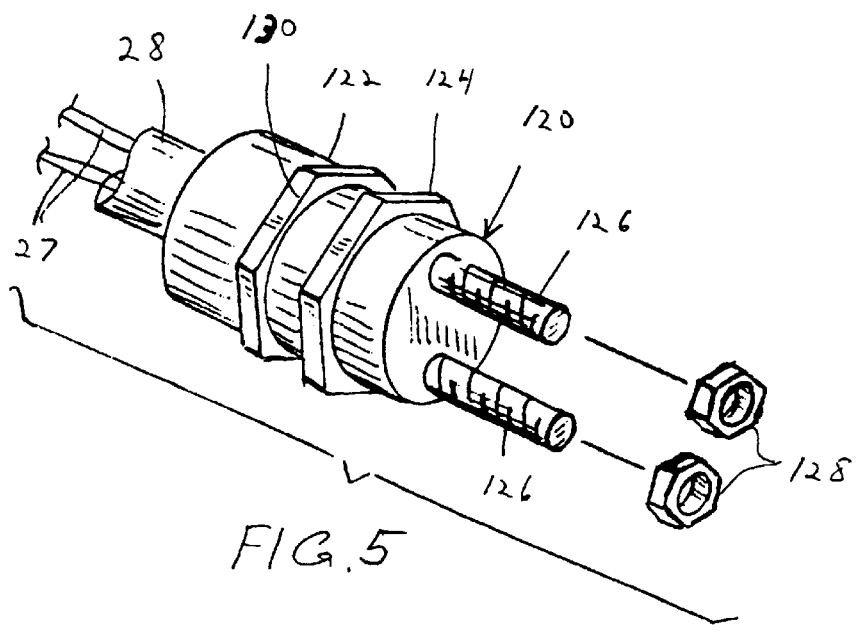
FIG. 5 is a perspective view of one of the electrical connectors shown in FIG. 3 which connects an electrical conductor cable to the lead frame assembly.

As shown in FIGS. 2–3, the electrical conductor cables 24, 26 and 28 are preferably attached to the distribution box 12 with the use of electrical connectors 120*a*, 120*b*, 120*c* (sometimes generally referred to herein as electrical connectors 120). The electrical connectors 120*a*, 120*b*, 120*c* are substantially identical to each other except for their size. Referring also to FIG. 5, one of the electrical connectors 120 is shown. Each electrical connector 120 generally comprises an outer housing 122, a fastener 124, two electrical posts or terminals 126 and two post fasteners 128.

The outer housing 122 is suitably sized and shaped to be inserted into one of the apertures 40, 44 in the container 34. The outer housing 122 comprises a flange 134 contacting the outer side of the container 34. The fastener 124 is screwed onto a portion of the outer housing 122. The fastener 124 can be located against an interior side of the container 34 to thereby clamp portions of the container 134 between the flange 130 and the fastener 124. This can fixedly attach the connector 120 to the container 134. However, in alternate embodiments, any suitable means could be used to attach the connector to the housing of the distribution box.

The posts 126 are electrically connected to respective electrical conductors 27 of the electrical cables inside the outer housing 122. In the embodiment shown, the posts 126 extends generally parallel to each other from a front end of the outer housing 122. Each post 126 has a threaded section.

The posts 126 are suitably sized and shaped to be inserted into the apertures 96, 102 or 106, 112.

The post fasteners 128 can be threaded onto the posts 126 to clamp portions of the bus bars between the front end of the outer housing 122 and the post fasteners 128 at the apertures 78, 82. In an alternate embodiment, the lead frame assembly could be adapted to be connected to other different types of electrical connectors. The shelves 80, 84 provide a clearance between the pairs of post fasteners and posts for each connector 120.

For the cable 24 from the battery 20, the posts 126 of the connector 120*a* are connected to the first bus bar 62 and the second bus bar 64, respectively, at the apertures 78, 96, 102. For the cables 26, 28 to the drive 18 and the auxiliary electrical components 22, the posts 126 of the connectors 120*b* and 120*c* are connected to the second bus bar 64 and the third bus bars 66, respectively, at the apertures 82, 106 and 112. With the fuses 90 in place, the distribution box 12 connects the two electrical conductors in the battery cable 24 to the pairs of electrical conductors in the cables 26, 28.

In the embodiment shown, as seen best in FIG. 2, the electrical connector 120*a* comprises a wire 130. The distribution box 12 also comprises a switch or sensor 132, such as a microswitch. The microswitch 132 comprises a lever 134. The microswitch 132 is fixedly attached to the container 34 of the distribution box. The lever 134 is adapted to be moved based upon the position of the cover 36 relative to the container 34. More specifically, when the cover 36 is in a closed position relative to the container 34, the microswitch lever 134 is depressed.

When the cover 36 is moved to an open position, the lever 134 moves upward to signal that the cover 36 has been moved to an open position. The microswitch 132 is connected by the wire 130 to a switch (not shown) which can disable supply of electricity through the connector 120*a*. Thus, when the cover 36 is moved to an open position, exposed electrically conductive portions inside the distribution box are disconnected from supply of electricity from the battery. This can prevent a person from receiving an inadvertent electrical shock, such as when replacing one of the fuses 90. However, in alternate embodiments any suitable sensor could be provided or, a sensor might not be provided.

The present invention can provide numerous advantages and benefits. The present invention can eliminate the use of most wires within an electric vehicle high voltage distribution box by the use of bus bars. This can make assembly much easier and reduce the weight of the distribution box. The present invention requires less space than conventional vehicle high voltage distribution boxes. The present invention uses fewer components than conventional vehicle high voltage distribution boxes. The present invention increases reliability by eliminating hard to control hand assembly operations which were used in conventional vehicle high voltage distribution boxes. The present invention can provide an electric vehicle high voltage distribution box which enables circuit fuses to be incorporated into the box without increasing space or complexity. The present invention can allow for an assembly process which is not labor intensive and is less prone to reliability issues than a conventional electric vehicle high voltage distribution box. Assembly of the distribution box with the electrical cables is now much faster than a conventional electric vehicle high voltage distribution box.

By over molding the frame 60 onto the bus bars 62, 64, 66, the lead frame assembly 32 can be provided as a unitary structure. This makes assembly with the connectors 120 much easier and faster than in the past. This easier assembly can thus provide the advantage to now make assembly of the distribution box 12 scalable to high volumes of vehicle manufacturer. When the frame 60 is over molded onto the bus bars, the frame 60 automatically supplies electrical insulation for the bus bars, but nonetheless automatically provides exposed areas of the bus bars at relatively precise predetermined positions for electrical connection to the connectors 120. The present invention can reduce assembly costs associated with a high voltage distribution box in an electric vehicle.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electrical distribution box comprising:
   a housing;
   a lead frame assembly located in the housing, the lead frame assembly comprising bus bars and an over molded frame which has been over molded onto the bus bars to connect the bus bars to each other;
   wherein the frame is comprised of molded polymer material and the frame further comprises three orthogonal support sidewalls, at least two orthogonal open sides, and dividers extending from two of the orthogonal support sidewalls towards the two orthogonal open sides.

2. An electrical distribution box as in claim 1 wherein the second orthogonal support sidewall comprises pairs of holes therethrough.

3. An electrical distribution box as in claim 2 wherein the second orthogonal support sidewall comprises separator shelves extending inward between respective pairs of the holes.

4. An electrical distribution box as in claim 1 wherein the bus bars comprise sections with apertures therethrough, and wherein the sections of the bus bars extend uncovered from the frame at holes through two of the orthogonal support sidewalls.

5. An electrical distribution box as in claim 1 wherein a first one of the bus bars has a general L shape and extends along a first one and a second one of the orthogonal support sidewalls.

6. An electrical distribution box as in claim 5 wherein a second one of the bus bars has a general L shape and extends along the first one and a third one of the orthogonal support sidewalls.

7. An electrical distribution box as in claim 6 wherein a third one of the bus bars has a general L shape and extends along the third orthogonal support sidewall and the second orthogonal support sidewall.

8. An electrical distribution box as in claim 7 wherein the second and third bus bars comprise fuse terminals attached thereto, the fuse terminals extending from the third orthogonal support sidewall.

9. An electrical distribution box as in claim 1 further comprising electrical fuse terminals connected to the bus bars, the electrical fuse terminals being adapted to removably receive electrical fuses therein.

10. A vehicle high voltage electrical distribution box comprising:
    a housing adapted to be mounted to a vehicle and having holes for conductors to pass therethrough; and
    a lead frame assembly located inside the housing, the lead frame assembly comprising:
    a plurality of electrical bus bars; and
    a molded frame permanently and stationarily connecting the bus bars to each other wherein the frame comprises three orthogonal support sidewalls, at least two orthogonal open sides, and dividers extending from second and third ones of the orthogonal support sidewalls towards the two orthogonal open sides.

11. A vehicle high voltage electrical distribution box as in claim 10 wherein the second orthogonal support sidewall and a first one of the orthogonal support sidewalls comprise pairs of holes therethrough.

12. A vehicle high voltage electrical distribution box as in claim 11 wherein the first and second orthogonal support sidewalls comprise separator shelves extending inward from the first and second orthogonal support sidewalls between respective pairs of the holes.

13. A vehicle high voltage electrical distribution box as in claim 11 wherein the bus bars comprise sections with apertures therethrough, and wherein the sections of the bus bars extend uncovered from the frame at the holes through the first and second orthogonal support sidewalls.

* * * * *